United States Patent [19]

Naton

[11] Patent Number: 4,879,096

[45] Date of Patent: Nov. 7, 1989

[54] LEAD- AND ANTIMONY-FREE SOLDER COMPOSITION

[75] Inventor: Paul E. Naton, North Ridgeville, Ohio

[73] Assignee: Oatey Company, Cleveland, Ohio

[21] Appl. No.: 340,370

[22] Filed: Apr. 19, 1989

[51] Int. Cl.[4] .............................................. C22C 13/00
[52] U.S. Cl. ................................. 420/561; 228/263.11
[58] Field of Search .................... 420/561; 228/263.11

[56] References Cited

U.S. PATENT DOCUMENTS

| | | | |
|---|---|---|---|
| 1,437,641 | 12/1922 | Ferriere et al. | 420/560 |
| 3,607,253 | 9/1971 | Cain | 420/562 |
| 4,670,217 | 6/1987 | Henson et al. | 420/562 |
| 4,695,428 | 9/1987 | Ballentine et al. | 420/561 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |

FOREIGN PATENT DOCUMENTS

| | | | |
|---|---|---|---|
| 51-4193 | 2/1976 | Japan | 420/561 |
| 52-6468 | 1/1977 | Japan | 420/561 |

Primary Examiner—Robert McDowell
Attorney, Agent, or Firm—Renner, Otto, Boisselle & Sklar

[57] ABSTRACT

Lead-free and antimony-free solder compositions are described which comprise, as essential ingredients, about 0.05% to about 3% by weight of silver; about 0.5% to about 6% by weight of copper; about 0.1% to about 3% by weight of bismuth; and about 88% to about 99.35% by weight of tin. In preferred embodiments, the solders are also essentially free of cadmium and may also be essentially free of both cadmium and zinc.

12 Claims, No Drawings

LEAD- AND ANTIMONY-FREE SOLDER COMPOSITION

FIELD OF THE INVENTION

This invention relates to lead-free and antimony-free tin-based solder compositions, and more particularly to such solder compositions which contain bismuth and copper. The solder compositions are especially adapted for joining copper tubing, brass pipe and fittings to be used in plumbing.

For many years, the predominant solder composition for joining copper tubing, brass pipe and fittings to be used in plumbing has been the tin-lead type. In recent years, lead has been found to be undesirable, and laws have been passed in many jurisdictions outlawing the use of lead-containing solders in the construction or repairing of potable water systems. As a result, considerable effort has been made to develop lead-free solders by substituting other elements in the solder while obtaining similar results.

In order to be useful, soldering compositions should melt at a relatively low and workable temperature and over wide temperature range called the working range. Working temperature ranges of at least about 25° F. and up to 35°-40° F. are desirable for solders melting at about 420°-425° F.

Tin-antimony solder compositions have been suggested in the prior art. For example, solder compositions comprising 95% by weight of tin and 5% by weight of antimony have been suggested, but such compositions have melting points of about 450° F. which is much higher than the tin-lead solder compositions that can be prepared to melt in the range of 360° F. Moreover, antimony is considered undesirable because it also contains some arsenic.

U.S. Pat. No. 1,437,641 describes solder compositions for aluminum containing 85% to 95% tin, 0.5% to 9.5% zinc, 0.5% to 4.5% silver and 0.5% to 4.5% copper. U.S. Pat. No. 4,778,733 describes lead-free solders which consist essentially of from about 0.05% to about 3% by weight of silver, from about 0.7% to about 6% by weight of copper and the balance is tin. The patentees teach that the soldering compositions, in addition to being free of lead, are also free of such elements as antimony, cobalt, bismuth, thallium, cadmium, mercury and gallium. The soldering compositions described in the '733 patent are reported to be useful for joining two copper members together.

U.S. Pat. No. 4,670,217 describes soldering compositions comprising 90-98.5% tin, 0.5-4% antimony, 0.5-4% zinc and 0.5-2% silver. The patentees report that the addition of the silver lowers the liquidus of the tin-antimony composition. Liquidus temperatures of the lead-free solder compositions described in this patent range from about 428° F. to about 440° F. with melting range of about 40°-50° F.

U.S. Pat. No. 4,695,428 describes lead-free and cadmium-free solders for joining metals, primarily copper tubing or brass pipe and fittings. The solder compositions described in the '428 patent comprise from 88-98.8% tin, 0.5-4% antimony, 0.5-4% zinc, 0.1-3% silver and 0.1-2% copper. The patentees report the addition of the copper to this composition results in bridging characteristics which approximate those of a 50/50 tin-lead solder. Also disclosed in the '428 patent is a solder composition which comprises 96.5% tin, 3% silver and 0.5% copper.

The preparation of lead-free solders containing nickel is described in U.S. Pat. No. 4,758,407. The solders described in the '407 patent contain, as essential ingredients, tin, and from 3-5% copper. Additional ingredients included in the solders include various antimony, silver and/or nickel combinations.

Lead-free solder compositions containing bismuth as an essential component are described in U.S. Pat. Nos. 3,607,253 and 4,806,309. The '253 patent describes tin-based solder alloys comprising as essential ingredient 1-5% by weight of bismuth, 3-3.8% by weight of silver, 0.7-1.3% of cadmium, 0.2-0.5% by weight of antimony, and the balance is substantially tin. The patentees disclose that the bismuth increases the stress rupture point and creep strength obtained. The '309 patent describes lead-free solder compositions consisting essentially of 90-95% tin, 1-4.5% bismuth, 3-5% antimony and 0.1-0.5% silver. The presence of bismuth reportedly lowers the melting point.

SUMMARY OF THE INVENTION

Lead-free and antimony-free solder compositions are described which comprise, as essential ingredients, about 0.05% to about 3% by weight of silver; about 0.5% to about 6% by weight of copper; about 0.1% to about 3% by weight of bismuth; and about 88% to about 99.35% by weight of tin. In preferred embodiments, the solders are also essentially free of cadmium and may also be essentially free of both cadmium and zinc.

DESCRIPTION OF THE PREFERRED EMBODIMENTS

The solder compositions of the present invention contain no lead or antimony and are usually nontoxic solder compositions. The solder compositions contain, as essential ingredients, silver, copper, bismuth and tin. Although other metals may be added to provide specific properties, the solders of the present invention generally are essentially free of cadmium and zinc. The terms lead-free, antimony-free and "essentially free of cadmium and zinc" are used in the context that if any of these metals are present at all, the metals are present in such low concentrations that any effect on health can be expected to be insignificant. Federal standards require the so-called lead-free solders to contain less than 2000 ppm (0.20%) of lead. For the purposes of this invention and the claims, the terms lead-free, antimony-free, and "essentially free of" indicate that the metal, if present at all in the solder, will be present in amounts of less than 500 ppm or 0.05%.

In one embodiment, the lead-free and antimony-free solder compositions of the present invention comprise, as essential ingredients, from about 0.5% to about 3% by weight of silver; about 0.5% to about 6% by weight of copper; about 0.1% to about 3% by weight of bismuth; and about 88% to about 99.35% by weight of tin.

Although the solder compositions of the present invention contain small amounts of silver, the combination of the silver with the copper and bismuth provides solder compositions having improved and desirable properties. Thus, in another embodiment, the solder compositions will contain less than 1% by weight of silver, and in a further preferred embodiment, the solder compositions will contain less than 0.5% by weight of silver and yet provide solder joints which are characterized by excellent shear and burst strength.

Accordingly, in one preferred embodiment, the solder compositions of the present invention comprise, as essential ingredients, about 0.05% to about 0.5% by weight of silver; about 1% to about 5% by weight of copper; about 0.5% to about 2% by weight of bismuth; and about 92.5% to about 98.45% by weight of tin. As mentioned above, solder compositions of the preferred embodiment generally are essentially free of cadmium and may also be free of zinc.

The solder compositions of the present invention are prepared by techniques well known in the art, and generally may be prepared by preparing a melt of the tin at about 750° F. (400° C.) whereupon the copper is added followed by the other metals.

The following examples illustrate the solder compositions of the present invention. Unless otherwise indicated in the examples and elsewhere in the specification and claims, all parts and percentages are by weight.

EXAMPLE 1

|  | %/Wt. |
| --- | --- |
| Tin | 95.9 |
| Copper | 3.0 |
| Bismuth | 1.0 |
| Silver | 0.1 |

This solder melts at 422° F. (217° C.) and exhibits a melting range of 31° F. (17° C.).

EXAMPLE 2

|  | %/Wt. |
| --- | --- |
| Tin | 95.8 |
| Copper | 2.7 |
| Bismuth | 1.3 |
| Silver | 0.2 |

The solder compositions of the present invention may be prepared as solid round wire in diameters of from 0.020 to about 0.250 inches. The solder also may be prepared as wire cored with rosin, organic or inorganic fluxes. Alternatively, the solder of the present invention can be prepared in shapes and sizes to meet special requirements. For example, the solder is easily manufactured into pigs and cakes or ingots which may be rectangular or circular in shape. Bars of various cross-sections, weights and lengths also can be prepared from the solder of the present invention. The solder compositions of the present invention also may be prepared as pastes or creams by mixing a powder form of the solder with a suitable flux or carrier by techniques well known in the art. The solder also may be prepared and used in the form of foils, sheets or ribbons in various thicknesses and weights.

The solders of the present invention provide joints which have a smooth appearance and which exhibit significant increases in the stress rupture point and creep strength. In order to demonstrate the suitability of the solders of the present invention for soldering, and in particular, soldering of copper tubing, the following tests have been conducted on the solder of Example 1 and the results are compared to those obtained with a commercial solder containing 95.5% tin, 4.0% copper and 0.5% silver. The commercial solder contains no bismuth.

The first test evaluates the hydrostatic burst strength of pieces of copper tubing soldered together with the solder of Example 1 and the commercial solder described above. In this test, five replicated samples are prepared, and each sample consists of a five-inch length of one-inch, Type "L" copper pipe with one end soldered to a threaded adapter, and the other end is soldered into a standard cap. All components are cleaned and prepared employing standard plumber techniques. In this test, the assembly is pressurized with oil until failure occurs in either the tube or the solder joint.

The second test is a lap shear strength test conducted on three replicated samples. Each sample consists of two, nine-inch lengths of ½-inch Type "L" copper pipe and one, ½-inch sweat coupling. All components are cleaned and prepared employing standard plumber techniques. One length of pipe is fully inserted into the coupling while the other length is inserted only half way. The purpose for the half insertion is to raise the stress levels in the solder joint, since prior tests revealed that the full depth solder joint is stronger than the copper pipe. Each prepared sample is then installed in a universal test machine and pulled to failure. The data are recorded and used to develop the data in the following table.

TABLE I

| Solder | Solder Strengths | | Burst Strength[b] |
| --- | --- | --- | --- |
|  | Shear Strength[b] | | |
|  | Individual | Average | |
| Example 1 | 8502 | 8473 | 5300 |
|  | 8281 |  | 5300 |
|  | 8697 |  | 5200 |
|  |  |  | 5100[c] |
|  |  |  | 5200 |
| Commercial[a] | 6477 | 6332 | 5100 |
|  | 6536 |  | 5200 |
|  | 5983 |  | 5200 |
|  |  |  | 5300 |
|  |  |  | 5200 |

[a]95.5% tin, 4.0% copper, and 0.5% silver.
[b]PSI
[c]End cap split-remaining samples split longitudinally.

As can be seen from the results summarized in Table I, the average shear strength of the solder of Example 1 is significantly higher than the shear strength obtained with the commercial solder. The burst strength values reflect the strength of the copper tube since both solders are stronger than copper.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:
1. A lead- and antimony-free solder composition comprising as essential ingredients
   about 0.05% to about 3% by weight of silver;
   about 0.5% to about 6% by weight of copper,
   about 0.1% to about 3% by weight of bismuth; and
   about 88% to about 99.35% by weight of tin.
2. The solder composition of claim 1 which is essentially free of cadmium.

3. The solder composition of claim 1 which is essentially free of cadmium and zinc.

4. The solder composition of claim 1 containing about 1% to about 5% by weight of copper.

5. The solder composition of claim 1 containing about 0.5% to about 2% by weight of bismuth.

6. The solder composition of claim 1 containing less than 1% by weight of silver.

7. The solder composition of claim 1 containing less than 0.5% by weight of silver.

8. A lead- and antimony-free solder composition comprising as essential ingredients
about 0.05% to about 0.5% by weight of silver;
about 1% to about 5% by weight of copper;
about 0.5% to about 2% by weight of bismuth; and
about 92.5% to about 98.45% by weight of tin.

9. The solder composition of claim 9 which is essentially free of cadmium.

10. The solder composition of claim 9 which is essentially free of cadmium and zinc.

11. A lead- and antimony-free solder composition comprising as essential ingredients
about 0.1% by weight of silver;
about 3% by weight of copper;
about 1% by weight of bismuth; and
the balance is substantially tin.

12. The solder composition of claim 11 which is also free of cadmium and zinc.

* * * * *